United States Patent
Chu et al.

(10) Patent No.: US 8,046,528 B2
(45) Date of Patent: Oct. 25, 2011

(54) DATA WRITING METHOD FOR FLASH MEMORY, AND FLASH MEMORY CONTROLLER AND STORAGE DEVICE THEREOF

(75) Inventors: Chien-Hua Chu, Hsinchu County (TW); Wei-Chen Teo, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 562 days.

(21) Appl. No.: 12/047,144

(22) Filed: Mar. 12, 2008

(65) Prior Publication Data

US 2009/0172256 A1    Jul. 2, 2009

(30) Foreign Application Priority Data

Dec. 31, 2007 (TW) ................................ 96151550 A

(51) Int. Cl.
*G06F 12/00* (2006.01)
(52) U.S. Cl. .................................... 711/103; 365/185.03
(58) Field of Classification Search .................. 711/103; 365/185.03
See application file for complete search history.

(56) References Cited

U.S. PATENT DOCUMENTS

| 7,639,531 B2 * | 12/2009 | Cornwell et al. | 365/185.03 |
| 2006/0126394 A1 * | 6/2006 | Li | 365/185.22 |
| 2006/0155921 A1 * | 7/2006 | Gorobets et al. | 711/103 |
| 2007/0245098 A1 * | 10/2007 | Takada | 711/156 |
| 2008/0002467 A1 * | 1/2008 | Tsuji | 365/185.11 |

* cited by examiner

*Primary Examiner* — Hashem Farrokh
(74) *Attorney, Agent, or Firm* — J.C. Patents

(57) ABSTRACT

A data writing method for a block of a multi level cell NAND flash memory including upper page addresses and lower page addresses is provided, wherein a writing speed at the lower page addresses is higher than that at the upper page addresses. The data writing method includes receiving a writing command and determining whether an address to be written with new data in the writing command is the upper page address of the block. The method also includes copying old data previously recorded on the lower page addresses of the block as an old data backup when the address to be written in the writing command is the upper page address of the block and then writing the new data to the address to be written. Thus, old data may be protected while writing data to the upper page address of the multi level cell NAND flash memory.

13 Claims, 6 Drawing Sheets

| lower page | upper page |
|---|---|
| 0 | 4 |
| 1 | 5 |
| 2 | 8 |
| 3 | 9 |
| 6 | 12 |
| 7 | 13 |
| 10 | 16 |
| 11 | 17 |
| ⋮ | ⋮ |
| 110 | 116 |
| 111 | 117 |
| 114 | 120 |
| 115 | 121 |
| 118 | 124 |
| 119 | 125 |
| 122 | 126 |
| 123 | 127 |

DATA WRITING METHOD FOR FLASH MEMORY, AND FLASH MEMORY CONTROLLER AND STORAGE DEVICE THEREOF

CROSS-REFERENCE TO RELATED APPLICATION

This application claims the priority benefit of Taiwan application serial no. 96151550, filed on Dec. 31, 2007. The entirety of the above-mentioned patent application is hereby incorporated by reference herein and made a part of this specification.

BACKGROUND

1. Technology Field

The present invention relates to a data writing method for a flash memory, and more particularly, to a data writing method for a flash memory with a data protection mechanism, a flash memory controller and a flash memory storage drive using the data writing method.

2. Description of Related Art

With the booming market of digital cameras, camera cell phones and MP3s in recent years, demand for memory storage devices by consumers are rapidly increasing. Flash memories having the advantages of non-volatility, power-saving, small size and having no mechanical structure are suitable in portable applications, especially suitable for these types of portable products that are powered by batteries. In addition to the demand of memories embedded in products, there may also be an even larger market of mini memory cards and USB flash disks because a single user may own multiple USB flash disks and mini memory cards. Therefore, the flash memory industry has become extremely demanding in the electronics industry in recent years.

Flash memories have been developed from a single level cell NAND flash memory to a multi level cell NAND flash memory. Due to physical characteristics of the multi level cell NAND flash memory, electronic charges may be unstable in programming some pages of the flash memory, which may affect adjacent pages. Therefore, the multi level cell flash memory has a poor storing reliability despite of its large storage. On the other hand, the storage of the multi level cell flash memory is becoming larger and larger, which makes it increasingly suitable for being used as hard disks (e.g., solid state drives). Under this situation, whether the solid state drive employing the flash memory as storage medium is able to prevail in the market depends mainly on the data storage reliability.

What is needed, therefore, is a data writing method that can increase the reliability in storing data to the flash memory.

SUMMARY

The present invention is directed to a data writing method that can protect previously written data when writing new data to an upper page address of the multi level cell NAND flash memory.

The present invention is also directed to a flash memory controller that can perform a data writing procedure to protect previously written data when writing new data to an upper page address of the multi level cell NAND flash memory.

The present invention provides a data writing method suitable for a block of a multi level cell NAND flash memory. The block comprises a plurality of upper page addresses and a plurality of lower page addresses at which a writing speed is higher than at the upper addresses. The data writing method comprises: receiving a writing command; determining whether an address to be written with new data in the writing command is an upper page address of the block; copying old data recorded on at least one of lower page addresses of the block as an old data backup when the address to be written with new data is the upper page address of the block; and writing the new data to the address to be written.

The present invention provides a flash memory controller suitable for a storage device with a multi level cell NAND flash memory. A block of the multi level cell NAND flash memory comprises a plurality of upper page addresses and a plurality of lower page addresses at which a writing speed is higher than that at the upper addresses. The flash memory controller comprises a microprocessor unit, a flash memory interface, a buffer and a memory management module. The flash memory interface is used for accessing to the multi level cell NAND flash memory. The buffer is used for temporarily storing data. The memory management module is configured to receive a writing command, determine whether an address to be written with new data in the writing command is an upper page address of the block, copy old data recorded on at least one of lower page addresses of the block as an old data backup when the address to be written with new data is the upper page address of the block, and write the new data to the address to be written.

The present invention provides a flash memory storage device, comprising: a bus interface for connecting to the host, a multi level cell NAND flash memory for storing data and a controller. A block the multi level cell NAND flash memory comprises a plurality of upper page addresses and a plurality of lower page addresses at which a writing speed is higher than that at the upper addresses. The controller, electrically connected to the bus interface and the multi level cell NAND flash memory for suitable for receiving a writing command, determining whether an address to be written with new data in the writing command is an upper page address of the block, copying old data recorded on at least one of lower page addresses of the block as an old data backup when the address to be written with new data is the upper page address of the block, and writing the new data to the address to be written.

According to embodiments of the present invention, before new data is written to an upper page address of a block of the MLC NAND flash memory, old data on corresponding lower page address will be backed up. Accordingly, once an abnormal event occurs in data writing, resulting in the damage of data on corresponding lower page address, the state before the abnormal event can be restored from the data backup. As such, the data that has been written according to previous writing commands can be effectively protected.

In order to male the aforementioned and other features and advantages of the present invention more comprehensible, embodiments accompanied with figures are described in detail below.

DESCRIPTION OF THE EMBODIMENTS

Figure 1:
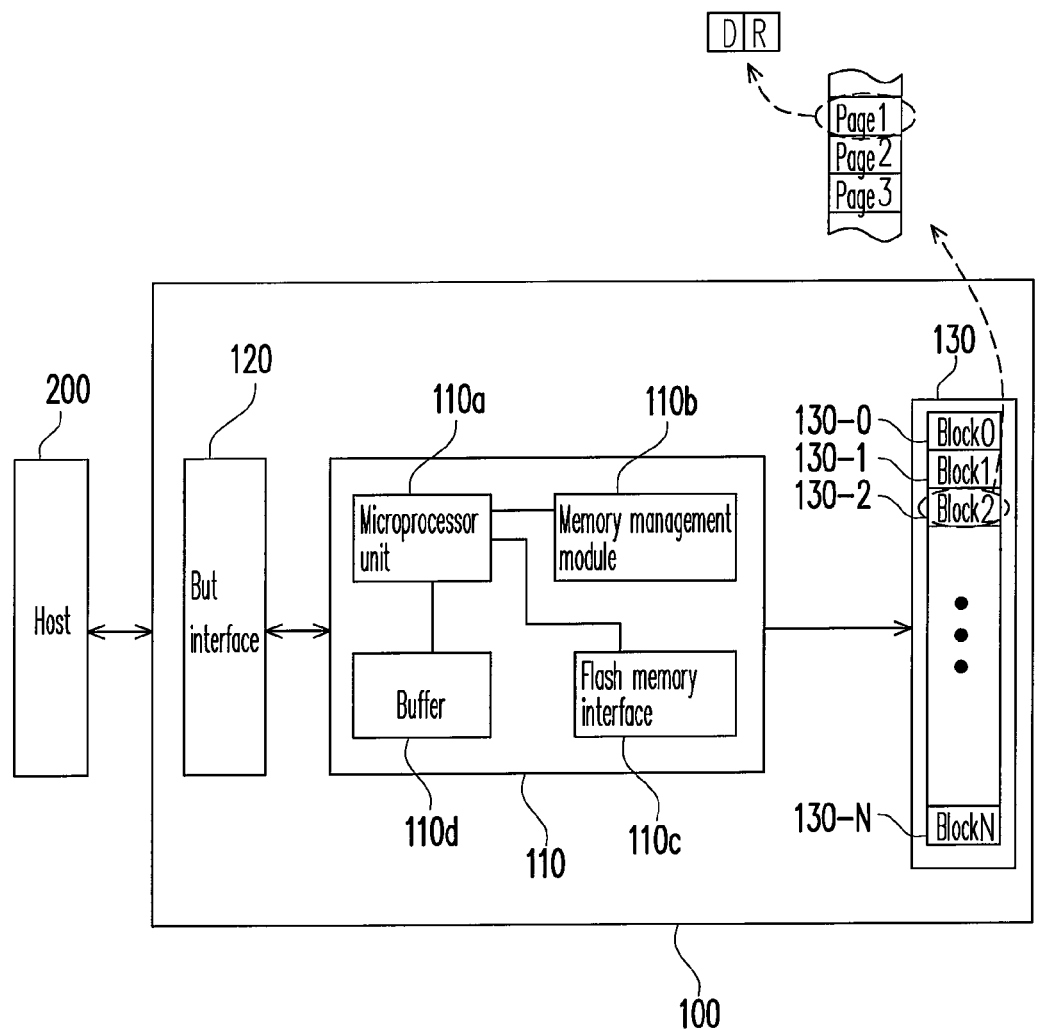
FIG. 1 illustrates a general block diagram of a flash memory storage device according to one embodiment of the present invention.

FIG. 1 illustrates a general block diagram of a flash memory storage device according to one embodiment of the present invention. Referring to FIG. 1, the flash memory storage device 100 includes a controller 110, a bus interface 120 and a flash memory 130. The flash memory storage device 100 is usually used with a host 200 to enable the host 200 to write date into or read data from the flash memory storage device 100. In the illustrative embodiment, the flash memory storage device 100 is illustrated as a USB flash disk. It is to be understood that, in alternative embodiments, the flash memory storage device 100 may also be a memory card or a solid state drive (SSD).

The controller 110 controls operations of the bus interface 120 and the flash memory 130, for example, storing, reading, erasing of data or the like. The controller 110 includes a microprocessor unit 110a, a memory management module 110b, a flash memory interface 110c and a buffer 110d.

The microprocessor unit 110a controls operations of the memory management module 110b, the flash memory interface 110c and the buffer 110d.

Figure 4A:
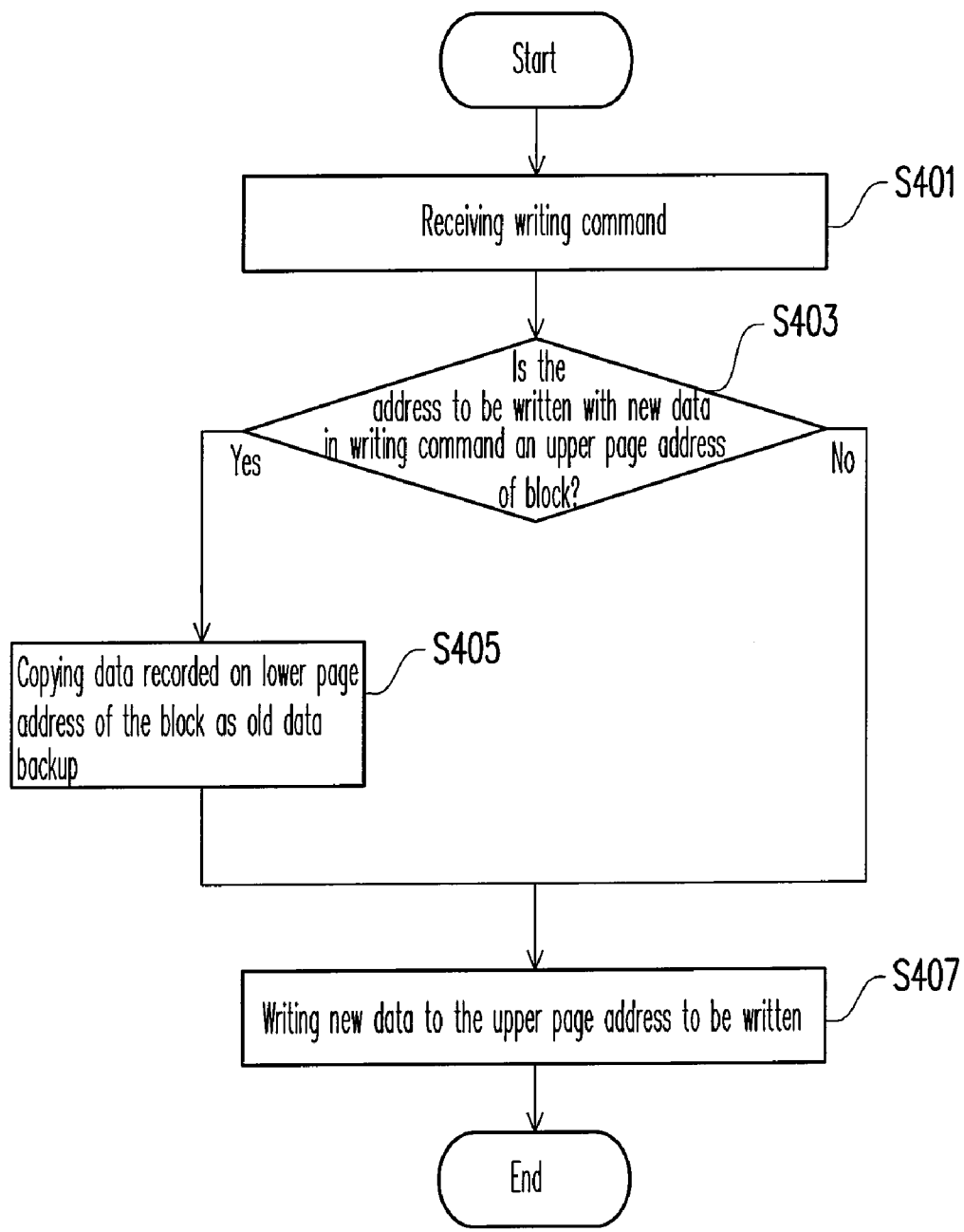
FIG. 4A illustrates a flow chart of data writing method according to one embodiment of the present invention.
Figure 4B:
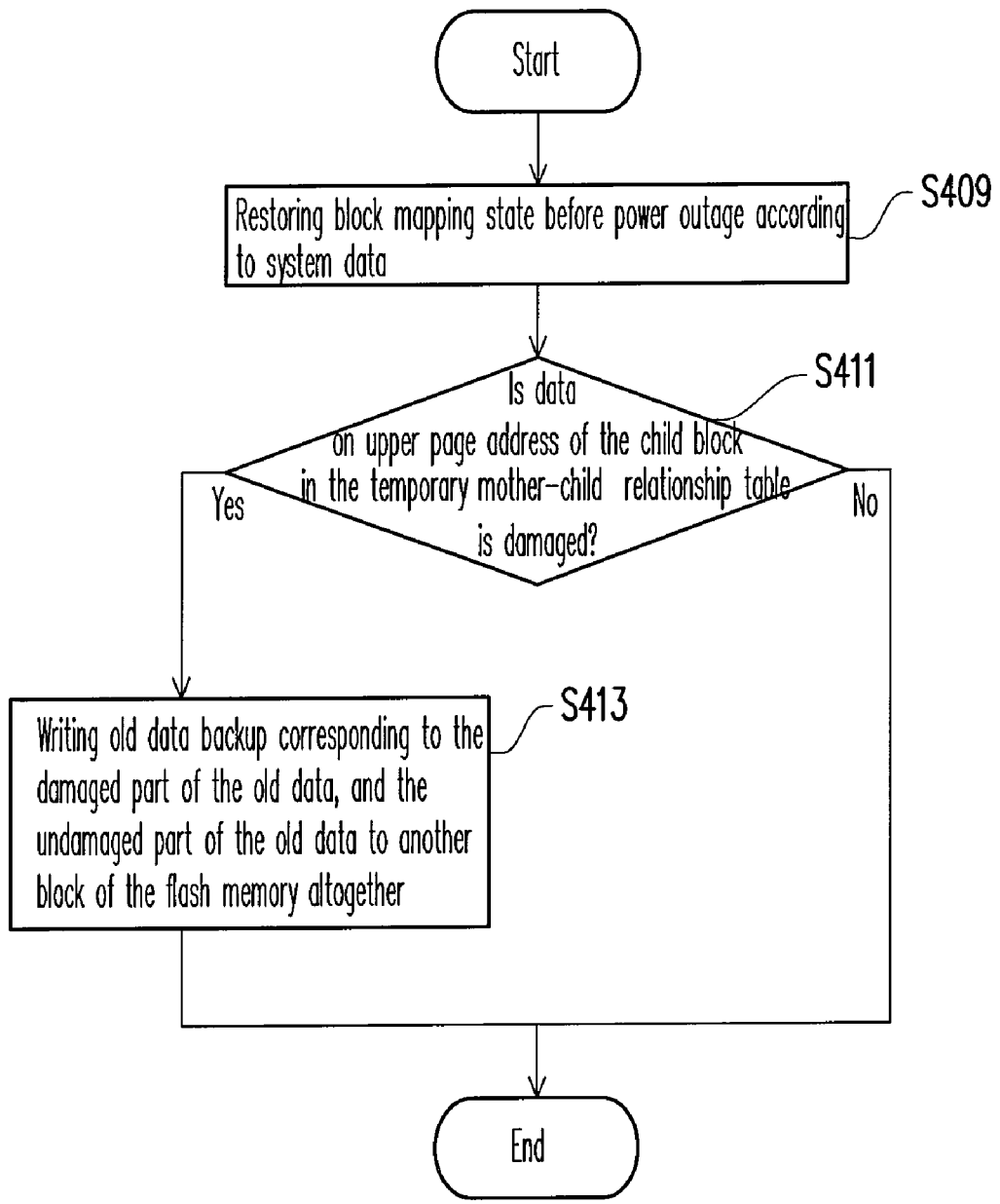
FIG. 4B illustrates a flow chart of a restoring procedure in the event of an abnormity in data writing according to one embodiment of the present invention.

The memory management module 110b is electrically connected to the microprocessor unit 110a. The memory management module 110b manages the flash memory 130, for example, to perform wear levelling function, damaged block management, mapping table maintenance, or the like. In particular, in embodiments of the present invention, the memory management module 110b also performs a data writing procedure (As illustrated in FIGS. 4A and 4B) according to the present embodiment.

The flash memory interface 110c is electrically connected to the microprocessor unit 110a and configured to access to the flash memory 130. That is, data to be written into the flash memory 130 by the host 200 are transformed into a format compatible with the flash memory 130 through the flash memory interface 110c.

The buffer 110d connected to the microprocessor unit 110a is used to temporarily store system data (e.g., a logical-physical mapping table) or data to be written or read by the host 200. In the illustrative embodiment, the buffer 110d is a static random access memory (SRAM). It is to be understood that the present invention is not limited to the illustrated embodiment; rather, the buffer may also be a dynamic random access memory (DRAM), a magnetoresistive random access memory (MRAM), a phase change random access memory (PRAM), or another suitable memory, in an alternative embodiment.

Besides, although not shown in the drawings, the controller 110 may further include common function modules of a typical flash memory, such as an error correcting module, a power management module, or the like.

The bus interface 120 is electrically connected to the controller 110 for connecting to the host 200. The bus interface 120 may be a USB interface, an IEEE 1394 interface, a SATA interface, a PCI Express interface, a MS interface, a MMC interface, a SD interface, a CF interface, or an IDE interface.

The flash memory 130 is electrically connected to the controller 110 for storing data.

Usually, the flash memory 130 for data storage is substantially divided into a plurality of physical blocks 130-0 to 130-N. For illustration purpose, the term "physical block" is simply referred as "block" hereinafter. In general, each block is a minimum erasable unit in the flash memory. That is, each block contains a minimum number of memory cells that can be erasable at the same time. Each block is usually divided into a plurality of pages. Each page is usually a minimum unit of a program. However, it is noted that the minimum program unit may also be a sector in some types of flash memory, i.e., each page contains a plurality of sectors and each sector is a minimum program unit. In other words, a page is the minimum unit for data writing or reading. Each page usually includes a user data section D and a redundant section R. The user data section D stores data of a user, and the redundant section R stores data of a system (e.g., error correcting codes, ECCs).

In general, corresponding to the sector size of a disk drive, the user data section D usually has 512 bytes, and the redundant section R usually has 16 bytes. That is, one page is a sector. However, in alternative embodiments, a page may comprise of a plurality of sectors, for example, four sectors.

In general, one block may comprise any number of pages, for example, 64 pages, 128 pages, 256 pages, or another suitable number of pages. The blocks 130-0 to 130-N usually are grouped into a plurality of zones. Each block zone can be independently managed to some extent, which increases the degree of parallelism of parallel operations and simplifies the complexity of management.

Operation of the flash memory according to the present invention will be described as follows with reference to the drawings. It should be understood that the terms used to describe operation of the flash memory block, such as "pick-up", "movement", "substitute", are logical concepts. That is, the physical location of the flash memory block is not changed; rather, operation to the flash memory block is merely logically performed.

Figure 2A:
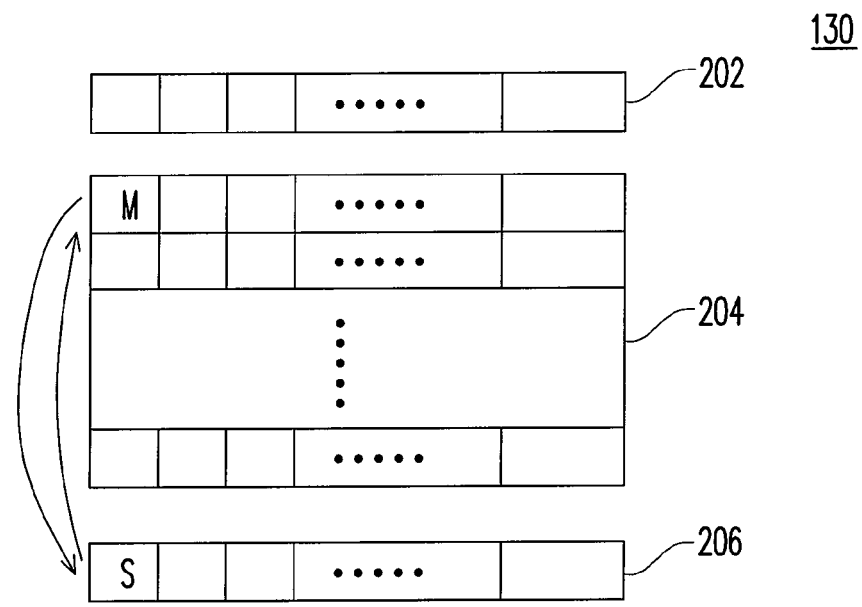
FIGS. 2A through 2C illustrate the block diagrams of the flash memory and its detail operation.
Figure 2B:
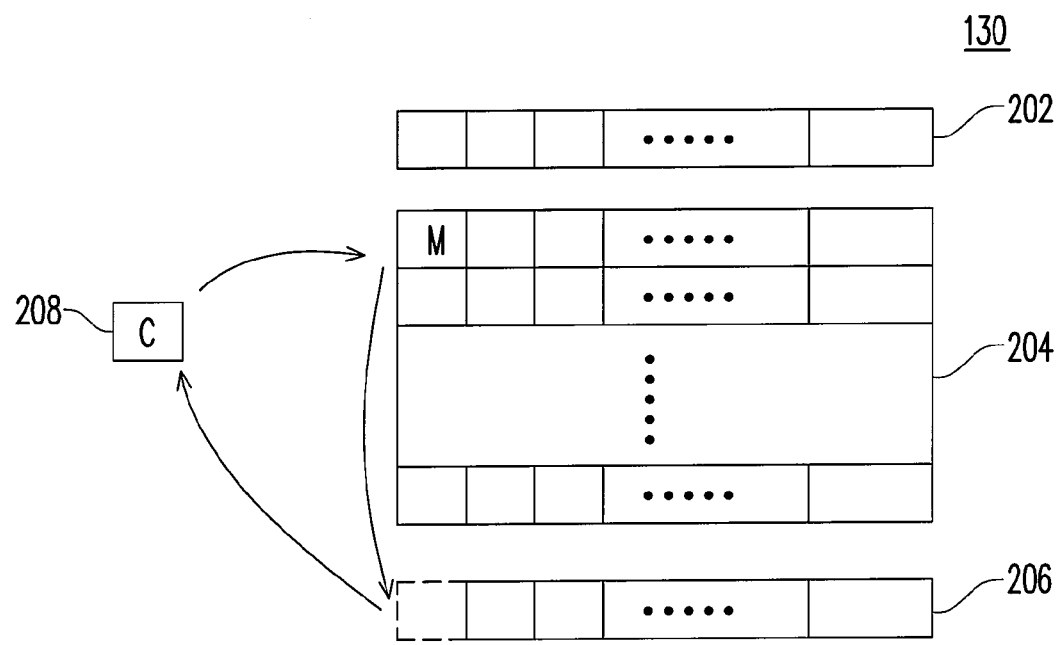
Figure 2C:
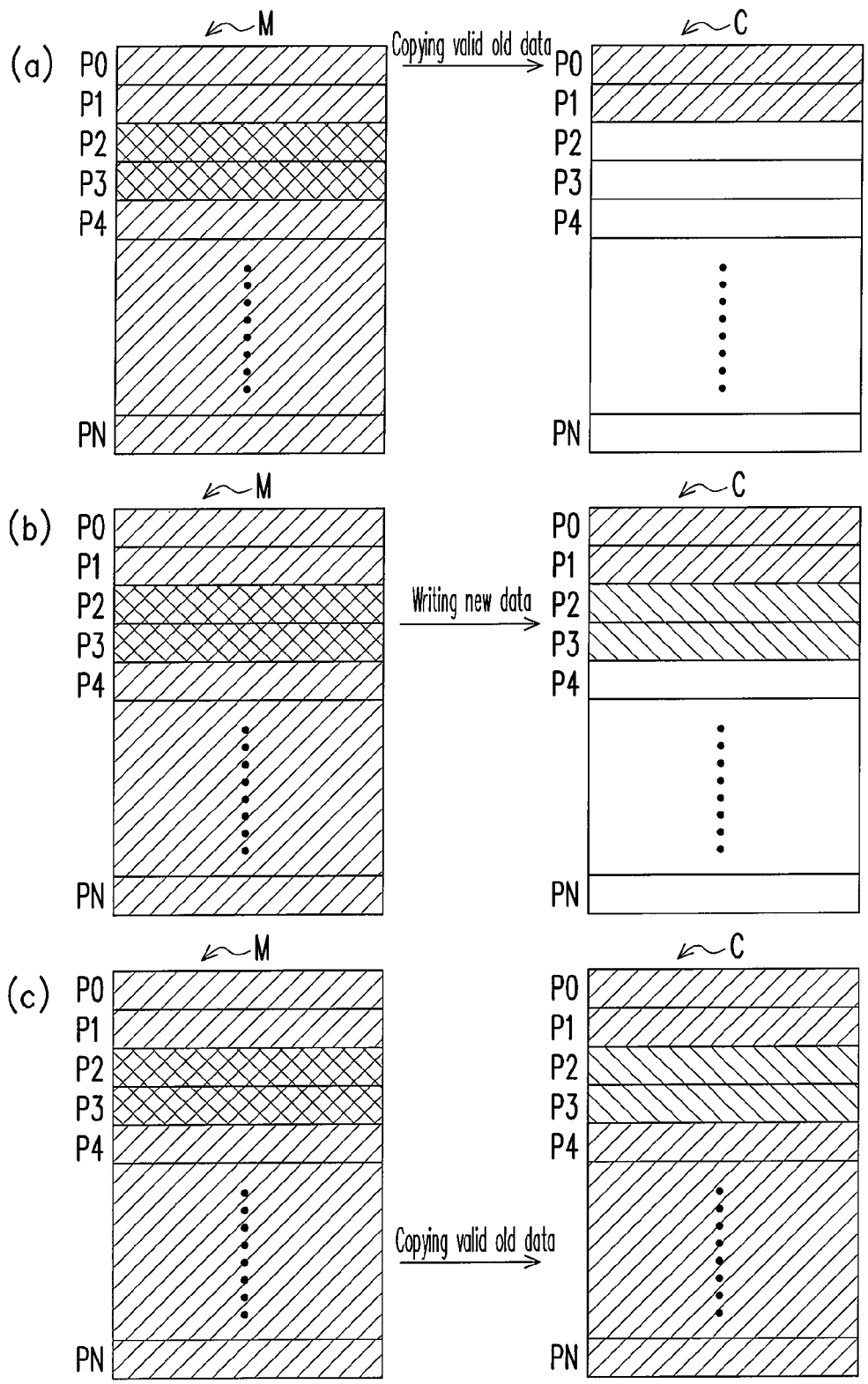

FIGS. 2A through 2C illustrate the block diagrams of the flash memory and its detail operation.

Referring to FIG. 2A, in the illustrative embodiment, to efficiently program (i.e., write and erase) the flash memory 130, the blocks 130-1 to 130-N of the flash memory 130 are logically grouped into a system area 202, a data area 204 and a spare area 206. In general, the blocks in the data area 204 occupy more than 90% of all blocks of the flash memory 130.

The blocks in the system area 202 store system data such as the number of the sections of the flash memory, the number of the blocks in each section, the number of the pages in each block, the logical-physical mapping table, or the like.

The blocks in the data area 204 store data of a user, and generally correspond to the addresses of the logical block operated by the host 200.

The blocks in the spare area 206 are used to substitute for the blocks in the data area 204. Therefore, the block in the spare area 206 is blank or available, namely, no data is recorded in these blocks or data recorded in these blocks has been marked as invalid data. To be specific, an erase operation has to be performed before writing data into a position in which data has been recorded. However, as described above, data is written into a flash memory in unit of pages while erased from the same in unit of blocks. Since an erase unit is larger than a write unit, before erasing data from a block, those valid pages in the block have to be copied to another block. Therefore, if new data is to be written into a block M of the data area 204 that already has data written into the block M, a block S is generally first picked up from the spare area 206, and the valid data is copied into the block S. After the new data is written into the block S, the block M is erased and moved to the spare area 206, and at the same time, the block S is moved to the data area 204. It should be understood that erasing the block M and moving it to the spare area 206 while moving the block S to the data area 204 are performed by logically associating the block M with the spare area 206 and associating the block S with the data area 204. It should also be understood that the logical relationship among the blocks in the data area 204 may be maintained by the logical-physical mapping table.

In general, to more efficiently use the flash memory 130, the blocks further include a substitute block 208. FIG. 2B illustrates another method of operating the flash memory, and FIG. 2C illustrates a detail operation of FIG. 2B.

Referring to FIGS. 2B and 2C, the substitute block 208 is a temporary state of the block gotten form spare area 206 used to substitute the block in the data section 206. Specifically, when a block C is picked up from the spare area 206 to substitute the block M of the data area 204, new data will be written into the block C, but the valid data in the block M will not be immediately moved to the block C and the block M will not be erased immediately. In particular, valid data in the block M before an address to be written (i.e., page P0 and page P1) is copied to the block C (as shown in (a) of FIG. 2C), and the new data (i.e., page P2 and page P3 in block C) is written into block C (as shown in (b) of FIG. 2C). Here, the block C having a part of valid old data and written new data is temporarily associated with the substitute block 208. This is because the valid data in the block M may become invalid during a subsequent operation, and thus, it may be meaningless to immediately move all the valid data in the block M to the physical block C. In this example, multiple physical block addresses may correspond to a single logical block address, i.e., combination of the data in block M and the data in block C is the data in the corresponding logical block. This temporary mother-child relationship between blocks (i.e., block M and block C) may be determined based on the size of the buffer 110d of the controller 110, and in the illustrative embodiment, there are five groups of blocks.

Later, only if it is desired to combine the data of the block M and block C, the block M and the block C are combined into one block, thereby increasing the efficiency in using the block. For example, as shown in (c) of FIG. 2C, when combined, remaining valid data (i.e., page P4 to PN) in the block M will be copied to the block C, the block M will then be erased and associated with the spare area 206. At the same time, the block C is associated with the data area 204, thus completing the combination.

Figures 3A, 3B:
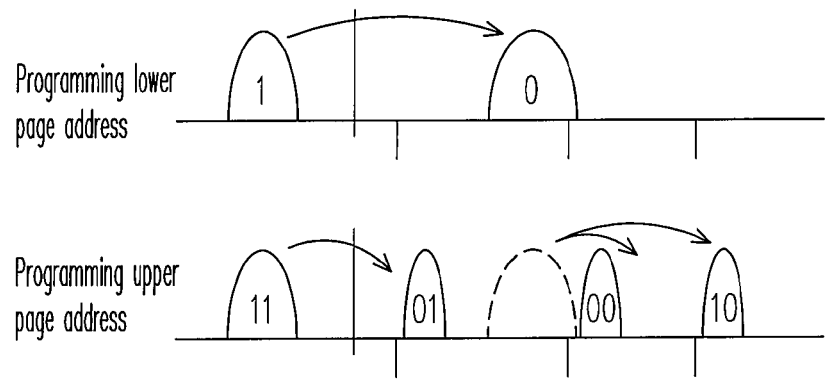
FIG. 3A illustrates two-phase programming of a multi level cell NAND flash memory according to one embodiment of the present invention.
FIG. 3B illustrates page addresses of a block of the multi level cell NAND flash memory according to one embodiment of the present invention.

In addition, in the illustrative embodiment, the flash memory 130 is a multi level cell (MLC) NAND flash memory which can be programmed in multi-phase. For example, in the case of a four level cell, as shown in FIG. 3A, programming of the block can have two phases. The first phase is the writing into a lower page, the physical characteristic of which is similar to that of a single level cell (SLC) NAND flash memory. After the first phase is completed, an upper page is programmed. During programming, a writing speed at the lower page is higher than that at the upper page. Accordingly, the pages in each block can include upper pages and lower pages (as shown by block 130-0 in FIG. 3B). Particularly, the upper page and the lower page have a coupling relationship there-between. That is, if abnormity occurs in programming the upper page, it may cause the corresponding lower page to be unstable (i.e., it may cause data loss). That is why the MLC NAND flash memory is less reliable than the SLC NAND flash memory. Similarly, in the case of an eight level cell or six level cell, the memory cell may include more pages and is programmed in more phases. Here, the page at which the writing speed is the highest is referred to as a lower page, other pages at which the writing speed is relatively lower are commonly referred to as upper pages. For example, the upper pages include multiple pages each having a different writing speed.

It should be noted that, under the architecture of the flash memory storage device 100 as described above, when the host 200 requests the controller 110 of the flash memory storage device 100 to perform a writing command, after completing the data writing, the controller 110 will respond to the host 200 that the data has been written even if the blocks in the flash memory 130 are in the temporary mother-child relationship as described above. In this case, when the controller 110 performs a next writing command of the host 200, if the programming of the upper page fails, resulting in the loss of data that has been written into the corresponding lower page according to previous writing commands, the host 200 can only know the failure of data writing this time and generate corresponding failure information or rewrite the data, but will mistake the data written according to previous writing commands for correct data. Therefore, when the host 200 accesses to this page later, a reading error occurs. Thus, under this architecture of the flash memory storage device 100, the flash memory management module 110b will perform the data writing procedure according to one embodiment of the present invention to protect the data.

FIG. 4A illustrates a flow chart of data writing method according to one embodiment of the present invention.

Referring to FIG. 4A, when a writing command is received from the host 200 (step S401), it is determined, in step S403, that whether or not an address to be written with new data in the writing command is an upper page address of a block. If in step S403 it is determined that the address to be written with new data is the upper page address of the block, then in step S405 old data previously recorded on a lower page address of the block is copied as an old data backup. For example, in step S405, the flash memory management module 110b will determine the lower page address needing to be backed up corresponding to the upper page address to be written with data. Specifically, during the procedure of writing data into the flash memory physical block, the data will be sequentially written according to the number of the pages in the block (page number is set according to fabrication process). Therefore, when backing up the data of the lower page, the data on the lower page address corresponding to the upper page address to be written and on the addresses which are numbered before the upper page address may be copied and stored as backups. In other words, once a piece of data is written, the data stored in the memory cell of a same block with data previously written to the lower page but no data written to the upper page is backed up, thereby avoiding the data error or loss.

For example, when data is to be written to the block 130-0 as shown in FIG. 3B, if the page address to be written is 17, then the flash memory management module 110b may copy the data on page address 11 and store the data as an old data backup. If the page address to be written is 4, the flash memory management module 110b may copy the data on page addresses 0, 1, 2 and 3, and store the data as an old data backup. If the page address to be written is 16, the flash memory management module 110b may copy the data on page addresses 10 and 11, and store the data as an old data backup. If the page address to be written is 5, the flash memory management module 110b may copy the data on page addresses 1, 2, and 3, and store the data as an old data backup. Similarly, if the page address to be written is 8, the flash memory management module 110b may copy the data on page addresses 2 and 3, and store the data as an old data backup. It should be understood that the examples described above are not intended to limit the scope of the present invention; rather, those skilled in the art can readily deduce the page address needing to be backed up from the above examples. For example, the backup may also be performed with respect to the old data on the lower page address corresponding to the upper page address to be written and the data recorded on a predetermined number of lower page addresses after the corresponding lower page address. For example, in FIG. 3B, if the page address to be written is 4, the flash memory management module 110b may only copy the data on page addresses 0 and 1, and store the data as an old data backup.

In embodiments of the present invention, the old data backup will be stored in another block of the flash memory 130. However, it should be understood the present invention is not intended to be limited to these particular embodiments; rather, the old data backup may also be stored in another suitable non-volatile storage medium, such as, an additional MRAM.

To ensure the correctness of the data, the data on the lower page address corresponding to the upper page address to be written and on the addresses which are numbered before the upper page address can be copied and stored as backups, as described above. However, as described above, the upper page and the corresponding lower page in the MLC NAND flash memory have coupling relationship. Therefore, in another embodiment of the present invention, only the data recorded on the lower page address corresponding to the upper page address to be written can be copied and stored as old data backup in step S405. For example, if the page address to be written is 5, the flash memory management module 110b may backup data on page address 1. If the page address to be written is 16, the old data on page address 11 may be backed up.

If it is determined in step S403 that the address to be written is not the upper page address, no backup operation is needed. Afterwards, in step S407, the new data will be written to an upper page to be written.

In another embodiment of the present invention, the data writing procedure further includes deleting the old data backup after the new data has been written to the address to be written.

In embodiments of the present invention, the data on the lower page addresses will be backed up prior to writing new data to an upper page address. Thus, once the data on the lower page is damaged due to the abnormality in writing data to the upper page address, the correct data can be restored from the old data backups.

FIG. 4B illustrates a flow chart of a restoring procedure in the event of an abnormality in data writing according to one embodiment of the present invention.

Referring to FIG. 4B, when an abnormal event (e.g., power outage) occurs and the host restarts, the block mapping state before the power outage can be restored according to system data (e.g., logical-physical mapping table, temporary mother-child relationship table, or the like) in step S409. Afterwards, it will be determined in step S411 whether or not data on the upper page address of the child block (i.e., the block C) in the temporary mother-child relationship table is damaged. Specifically, the flash memory management module 110b will read the data on the lower page address corresponding to the previous upper page address to be written and the data on the addresses which are numbered before the upper page address, and check the correctness of the data according to corresponding error correcting codes.

If in step S411 data damage is discovered, then the old data backup corresponding to the damaged part of the old data, and the undamaged part of the old data will be written to another block of the flash memory 130 altogether to restore the state before the power outage in step S413. It should be mentioned that the data writing method could be implemented by firmware, hardware, software or one combined from the group consisting of firmware, hardware, software.

In summary, according to embodiments of the present invention, before new data is written to an upper page address of a block of the MLC NAND flash memory, old data on corresponding lower page address will be backed up. Accordingly, once an abnormal event occurs in data writing, resulting in the damage of data on corresponding lower page address, the state before the abnormal event can be restored from the data backup. As such, the data that has been written according to previous writing commands can be effectively protected. Moreover, this solution can effectively increase the reliability in writing data to the MLC NAND flash memory, making the SSD utilizing the MLC NAND flash memory more useful.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method suitable for a block of a multi level cell NAND flash memory, wherein the block comprises a plurality of upper page addresses and a plurality of lower page addresses respectively corresponding to the upper page addresses at which a writing speed is higher than that at the upper addresses, the data writing method comprising:
   (a) receiving a writing command and new data corresponding to the writing command and executing step (b);
   (b) determining whether an address to be written with the new data is one of the upper page addresses and only when the address to be written with new data is one of the upper page addresses, executing step (c) and when the address to be written with new data is not one of the upper page addresses, executing step (d);
   (c) continuously copying a plurality of old data from a first lower page address and at least one second lower page address as old data backups and executing step (d), wherein the first lower page address corresponds to the address to be written and the at least one second lower page address is located between the address to be written and the first lower page address; and
   (d) writing the new data to the address to be written.

2. The data writing method in accordance with claim 1, further comprising a step of deleting the old data backup after the new data has been written.

3. The data writing method in accordance with claim 1, further comprising a step of storing the old data backups in another block of the multi level cell NAND flash memory.

4. The data writing method in accordance with claim 1, further comprising a step of determining whether at least part of the old data is damaged when writing the new data to the address to be written and an abnormal event occurs, wherein when at least part of the old data is damaged, an undamaged part of the old data and a part of the old data backups corresponding to a damaged part of the old data-are written to another block of the multi level cell NAND flash memory.

5. A flash memory controller suitable for a storage device with a multi level cell NAND flash memory, wherein a block of the multi level cell NAND flash memory comprises a plurality of upper page addresses and a plurality of lower page addresses respectively corresponding to the upper page addresses at which a writing speed is higher than that at the upper addresses, the flash memory controller comprising:
- a microprocessor unit;
- a flash memory interface for accessing to the multi level cell NAND flash memory;
- a buffer for temporarily storing data; and
- a memory management module for receiving a writing command and new data corresponding to the writing command, determining whether an address to be written with the new data is one of the upper page addresses, continuously copying a plurality of old data from a first lower page address and at least one second lower page address as old data backups only when the address to be written with new data is one of the upper page addresses, and writing the new data to the address to be written,
- wherein the first lower page address corresponds to the address to be written and the at least one second lower page address is located between the address to be written and the first lower page address.

6. The flash memory controller in accordance with claim 5, wherein the memory management module deletes the old data backup after the new data has been written.

7. The flash memory controller in accordance with claim 5, wherein the memory management module stores the old data backups in another block of the multi level cell NAND flash memory.

8. The flash memory controller in accordance with claim 5, wherein the memory management module determines whether at least part of the old data is damaged when writing the new data to the address to be written and an abnormal event occurs, and
- wherein when at least part of the old data is damaged, the memory management module writes an undamaged part of the old data and a part of the old data backups corresponding to a damaged part of the old data to another block of the multi level cell NAND flash memory.

9. The flash memory controller in accordance with claim 5, wherein the storage device is one of a USB flash disk, a flash memory card and a solid state drive.

10. A flash memory storage device, comprising:
- a bus interface, for connecting to a host;
- a multi level cell NAND flash memory, for storing data, wherein a block the multi level cell NAND flash memory comprises a plurality of upper page addresses and a plurality of lower page addresses respectively corresponding to the upper page addresses at which a writing speed is higher than that at the upper addresses; and
- a controller, electrically connected to the bus interface and the multi level cell NAND flash memory for suitable for receiving a writing command and new data corresponding to the writing command, determining whether an address to be written with the new data is one of the upper page addresses, continuously copying a plurality of old data from a first lower page address and at least one second lower page address as old data backups only when the address to be written with new data is one of the upper page addresses, and writing the new data to the address to be written,
- wherein the first lower page address corresponds to the address to be written and the at least one second lower page address addresses is located between the address to be written and the first lower page address corresponding to the address to be written.

11. The flash memory storage device in accordance with claim 10, wherein the controller deletes the old data backup after the new data has been written.

12. The flash memory storage device in accordance with claim 10, wherein the controller stores the old data backups in another block of the multi level cell NAND flash memory.

13. The flash memory storage device in accordance with claim 10, wherein the controller determines whether at least part of the old data is damaged when writing the new data to the address to be written and an abnormal event occurs, and
- wherein when at least part of the old data is damaged, the controller writes an undamaged part of the old data and a part of the old data backups corresponding to a damaged part of the old data to another block of the multi level cell NAND flash memory.

* * * * *